United States Patent [19]

Fong

[11] 4,163,915

[45] Aug. 7, 1979

[54] ELECTRIC MOTORS OR GENERATORS

[75] Inventor: William Fong, Bristol, England

[73] Assignee: National Research Development Corporation, London, England

[21] Appl. No.: 817,924

[22] Filed: Jul. 21, 1977

[30] Foreign Application Priority Data

Jul. 26, 1976 [GB] United Kingdom ............... 31008/76

[51] Int. Cl.² ............................................. H02K 3/00
[52] U.S. Cl. ................................................... 310/198
[58] Field of Search ........ 310/180, 184, 198, 201–208; 318/768, 773–777; 322/90

[56] References Cited

U.S. PATENT DOCUMENTS

| | | | |
|---|---|---|---|
| 2,697,809 | 12/1954 | Hutchins | 310/202 |
| 2,697,810 | 12/1954 | Hutchins | 310/202 |
| 3,252,027 | 5/1966 | Korinek | 310/198 |
| 3,321,653 | 5/1967 | Sonoyama | 310/180 |
| 3,345,740 | 10/1967 | Murdock | 310/206 |
| 3,535,572 | 10/1970 | DeRugeris | 310/207 |
| 3,794,870 | 2/1974 | Broadway | 310/180 |
| 3,949,253 | 4/1976 | Broadway | 310/184 |
| 4,013,909 | 3/1977 | Broadway | 310/202 |

*Primary Examiner*—R. Skudy
*Attorney, Agent, or Firm*—Larson, Taylor and Hinds

[57] ABSTRACT

A three-phase wave-wound electric motor or generator with switched phase-winding parts for alternative voltage operation, one such connection placing all the phase-winding parts in parallel for low-voltage, specifically 110 volt operation. The phase-winding parts are not identical in that one of each pair includes a "dummy coil," that is a slot-position having no coil, or coils, included in circuit for some or all the alternative connections. The arrangement permits of an extra parallel connection compared with corresponding conventional windings and also provides harmonic suppression, reduction of magnetic noise and improvement of torque for motors and improved transient performance and improved output waveform for generators.

9 Claims, 8 Drawing Figures

PRIOR ART

ELECTRIC MOTORS OR GENERATORS

This invention relates to electric motors and generators and particularly to motors and alternators with balanced, three-phase wave windings.

The object of the invention is to provide improved windings for such machines capable of providing an additional voltage rating.

Accordingly, the invention provides a machine having a three-phase, wave winding comprising a plurality of similar, but not identical, phase-winding parts, said parts being connected together alternatively for alternative voltages, one such connection providing the parallel arrangement of all said phase-winding parts and said parts differing, one from another, by the presence of a dummy coil.

By a dummy coil is meant a slot position containing no coil, or coils, included in the circuit of the phase winding part concerned, the slot position being bridged for the series connection of the coils of the phase-winding part. Such dummy coil may be present, physically, in the winding and excluded from circuit solely in the parallel connection described, or it may be omitted physically from the winding, in which case it is necessarily omitted in all of the alternative connections of the windings. Advantageously the slot position devoid of coils is substantially in the center of the corresponding phase-winding part.

In order that the invention may be clearly understood and readily carried into practice, two conventional windings and two corresponding windings according to the invention will now be described in detail, by way of example, with reference to the accompanying drawings, in which.

Figure 7:
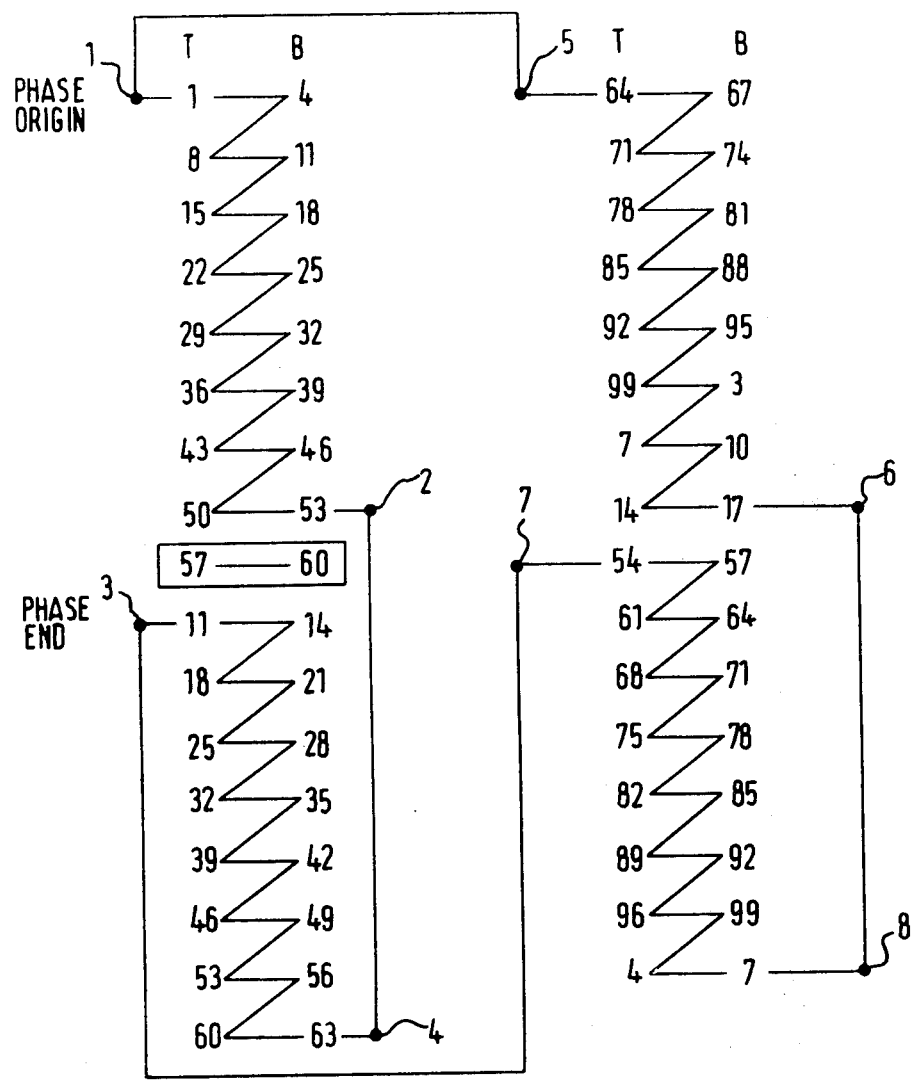
Figure 8:
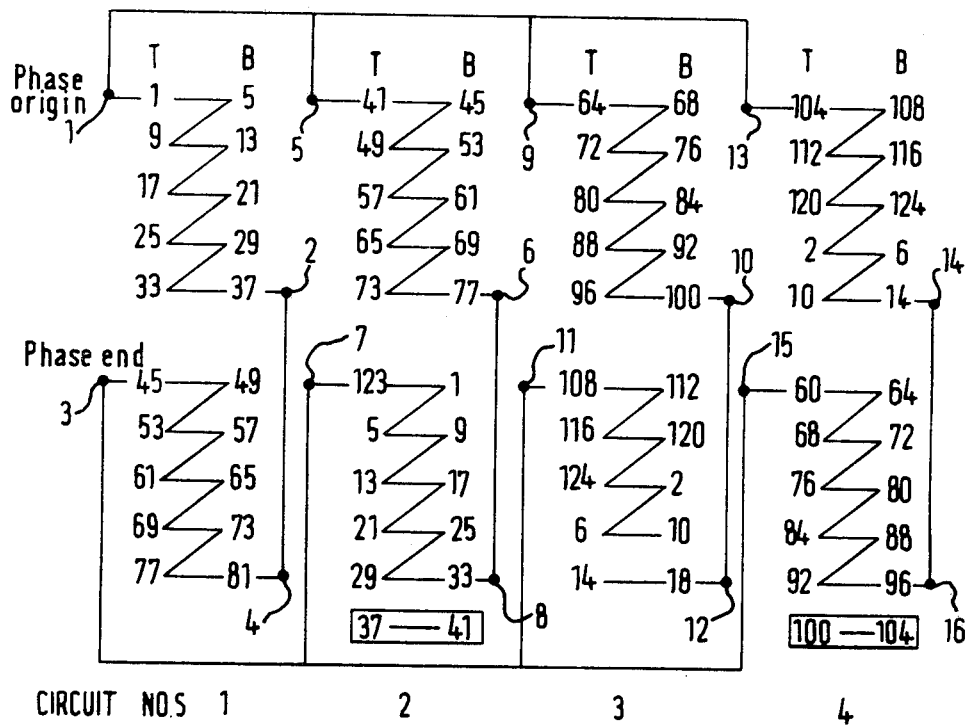

FIG. 7 shows one phase-winding of an alternative 28-pole, three-phase winding in 99 slots providing 2-parallel circuits; and FIG. 8 shows one phase-winding of an alternative 32-pole, three-phase winding in 126 slots providing 4-parallel circuits.

A waVe winding is characterised by the equation:

$$S = py \pm a \quad (1)$$

where
S is the armature slot number;
"p" is the pole-pair number;
"y" is the winding pitch;
the signs signify (+) a retrogressive winding and (−) a progressive winding; and
"a" is the number of plexes, which determines the number of parallel paths of the winding.

A wave winding is invariably a double-layer winding and, if single-turn coils are used, there will thus be only two conductors per slot. Such windings are particularly suited for low-voltage machines.

A typical, practical motor-alternator combination, frequently used in marine service, comprises a 3-phase, 4-pole synchronous or induction motor energised from a 3-phase, 50 HZ or 60 HZ mains supply, driving a 32-pole or a 28-pole, 3-phase wave wound alternator to provide, respectively, a 400 HZ or 420 HZ, 3-phase output at, say, 380 volts. By using alternative star/delta connections, the same alternator can have the dual-voltage rating, in the example given, of 380/220 volts. Because of the wide availability of 110 volt apparatus, it would be convenient, in the machine combination described, to provide the further alternative output voltage of 110 volts. This can readily be achieved in a machine according to the present invention.

Figure 1:
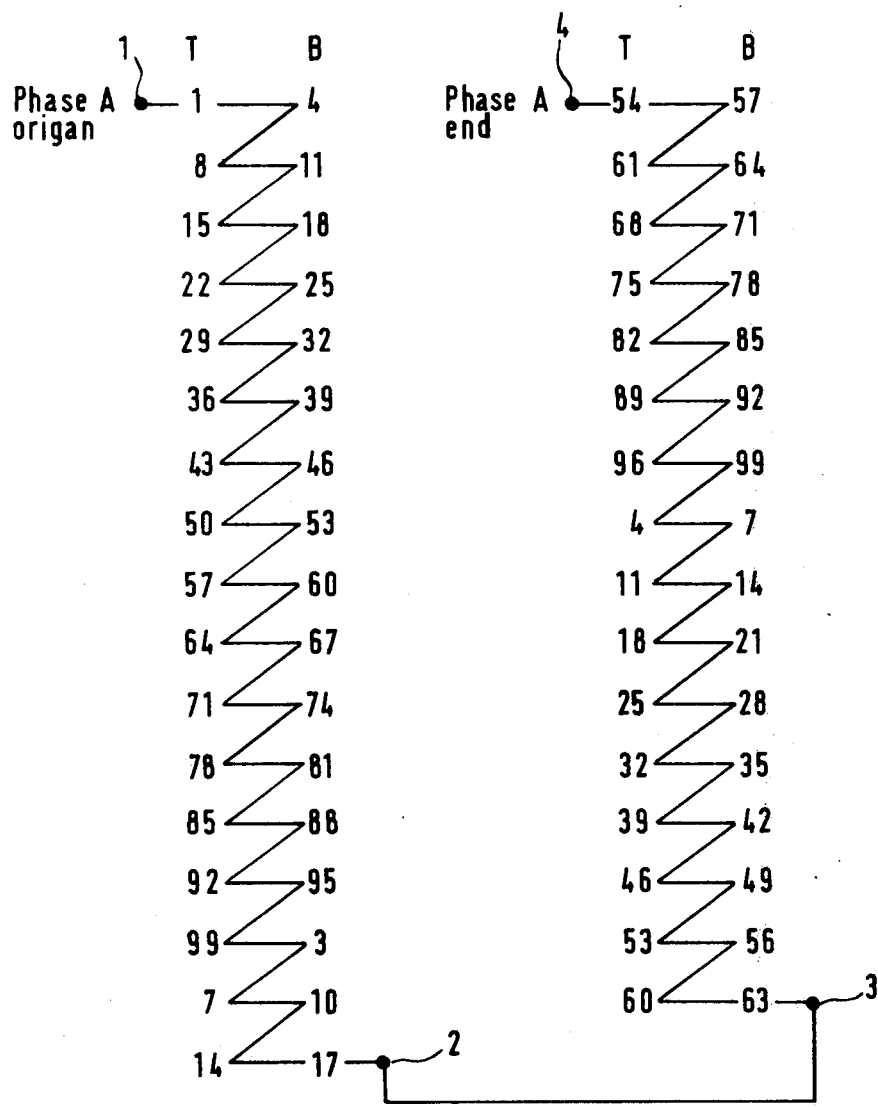
FIG. 1 shows one phase-winding of a conventional 28-pole, three-phase wave winding in 99 slots.

FIG. 1 is the connection diagram for phase-winding A of a conventional 28-pole, 3-phase, simplex, retrogressive wave winding in a 99-slot stator. The letters "T" and "B" denote "T" the top coil-side slot location and "B" the bottom coil-side slot location. Thus, the coil pitch is 3 slots (slot 1 to slot 4 and so on).

Evaluating Equation 1, above:
S = 99 slots
p = 14 pole-pairs
y = 7
a = (+)1 and the winding is a retrogressive, single circuit winding.

Assuming unit e.m.f. for every coil, the resultant e.m.f. of the 17-coil left-hand coil-sequence, between terminals 1 and 2, is 16.19 units. The resultant e.m.f. of the 16-coil right-hand coil-sequence, between terminals 3 and 4, is 15.32 units. The two resultant e.m.f.'s are co-phasal. The layer factor is 0.955 and the pitch factor is 0.972. Phases B and C are symmetrically displaced by 120° mechanical, so that only consideration of the one phase, phase A of FIG. 1, is necessary.

Figure 5:
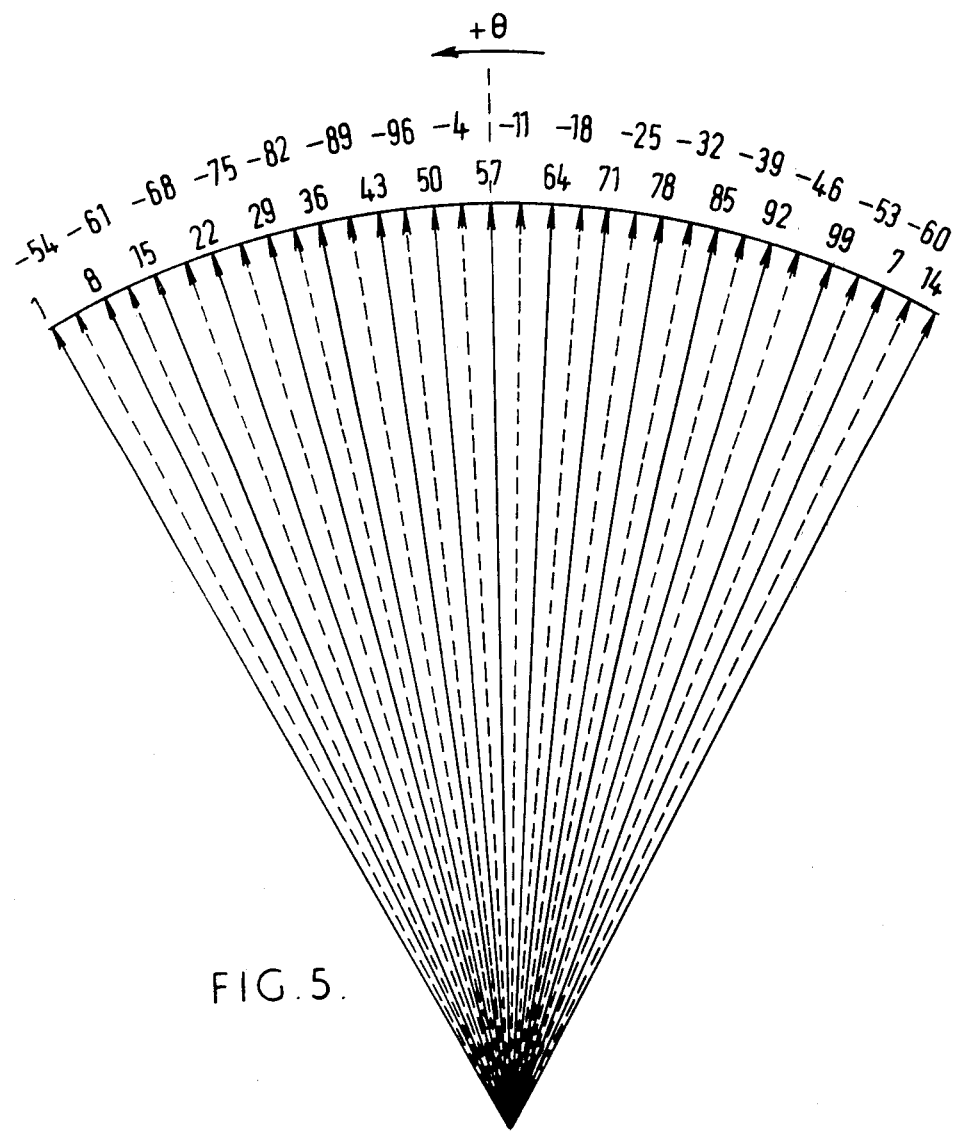
FIG. 5 is a slot vector diagram for one phase of the 28-pole winding shown in FIG. 1.

Analysis of the slot vectors on a 28-pole scale for the winding of FIG. 1, starting with coil T1 and ending with coil T14 shows that the slot vectors for the coil-sequence between terminals 1 and 2 are disposed symmetrically, one half of the slot vectors on each side of the slot vector of coil T57, the 9th coil of the coil-sequence, see FIG. 5.

Figure 2:
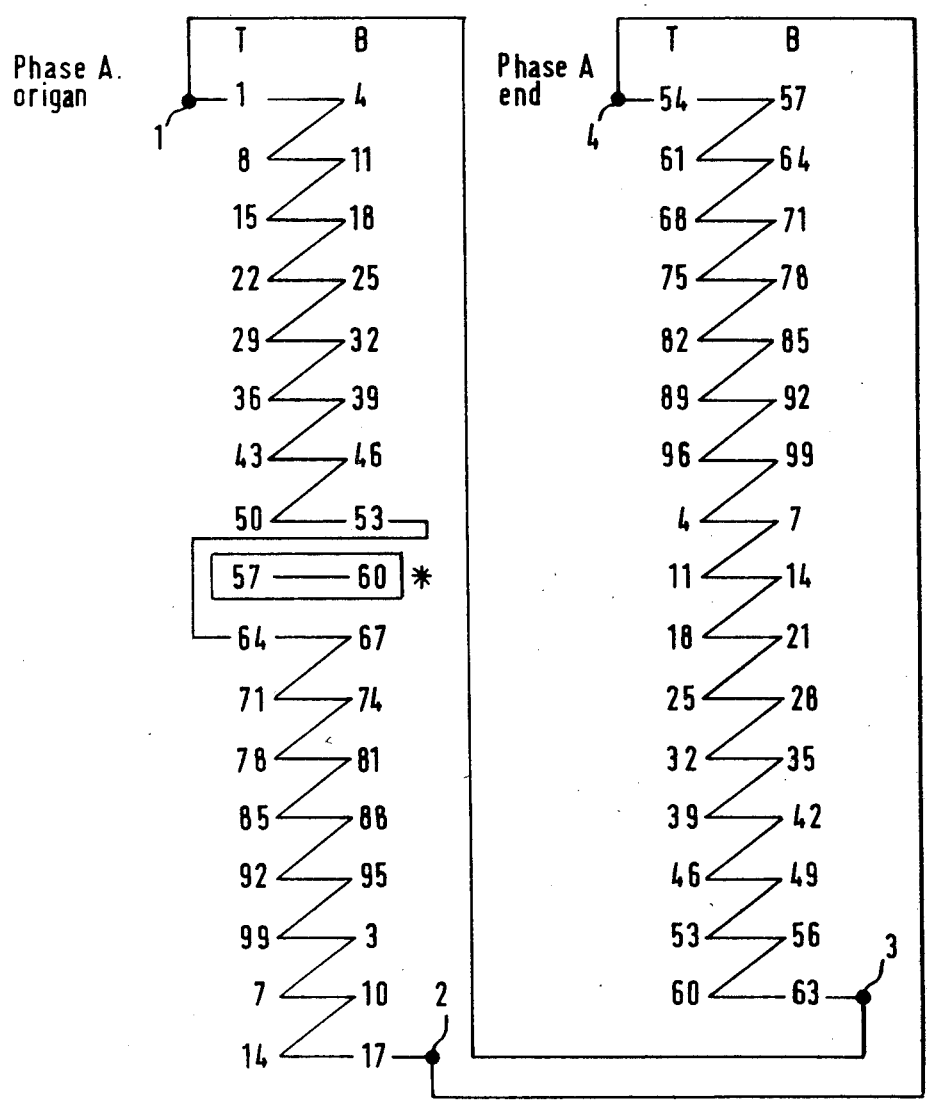
FIG. 2 shows one phase-winding of a corresponding 28-pole, three-phase wave winding in 99 slots according to the invention.

FIG. 2 shows phase A of a 3-phase 28-pole wave winding in 99 slots of generally similar form to that of FIG. 1 but differing in that, firstly, coil T57 is excluded from the coil-sequence and, secondly, the left hand coil-sequence between terminals 1 and 2, is connected in parallel with the right-hand coil sequence, between terminals 3 and 4.

For the winding of FIG. 2, the coil-pitch is 3 slots (slot 1 to slot 4 and so on) as for the winding of FIG. 1. Assuming unit e.m.f. for each coil, the resultant e.m.f. of the left-hand coil-sequence, between terminals 1 and 2, is 15.19 units and the resultant e.m.f. of the right-hand coil-sequence, between terminals 3 and 4, is 15.32 units. The two resultant e.m.f.'s are co-phasal and the average e.m.f. if 15.26 units.

The layer factor os 0.925, the pitch factor is 0.972 and the winding factor is 0.899. Phases B and C are symmetrically displaced by 120° mechanical with respect to phase A shown.

In a practical alternator, connections from all terminals 1, 2, 3 and 4 are brought out to switching terminals to permit of the further alternative parallel (delta) connection shown in FIG. 2. Together with the series star/series delta connections used for the winding of FIG. 1, the arrangement of FIG. 2 provides alternative voltage outputs in the ratios $2\sqrt{3}:2:1$, that is 380/220/110 volts in the specific instance. Thus, a series star/series delta/parallel delta connection can be provided (not shown).

Figure 3:
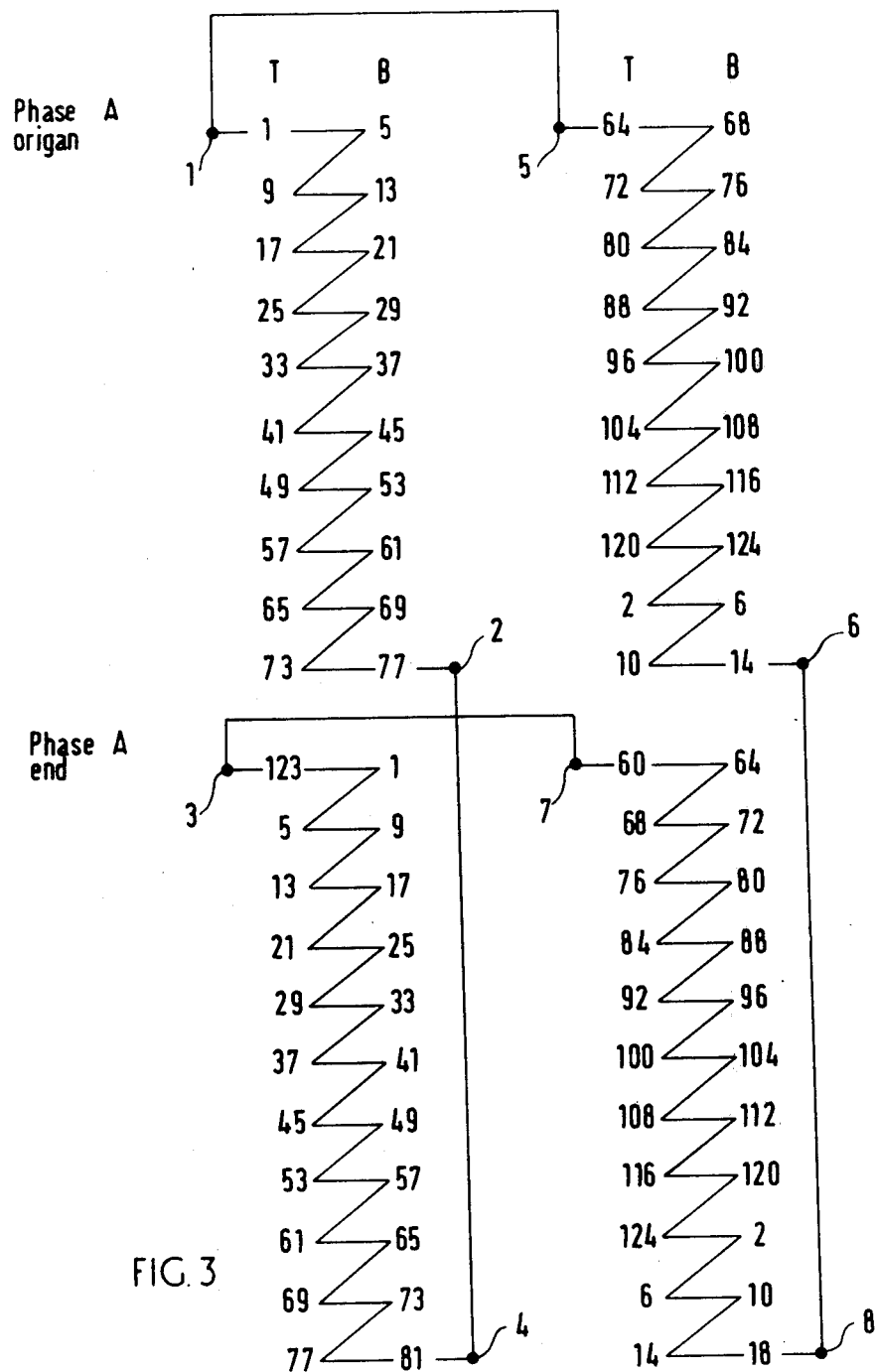
FIG. 3 shows one phase-winding of a conventional 32-pole, three-phase wave winding in 126 slots.

FIG. 3 shows phase A of a conventional 32-pole, 3-phase wave winding in 126 slots.

Evaluating Equation 1, above:
S = 126 slots
p = 16 pole-pairs
y = 8
a = (−)2 and the winding is thus a progressive winding with 2 circuits per phase.

The coil-pitch is 4 slots (slot 1 to slot 5 and so on). Assuming unit e.m.f. per coil, the resultant e.m.f. of the left half coil-sequence, between terminals 1 and 2 and terminals 4 and 3 in series, is 20.06 units. The resultant e.m.f. of the right half coil-sequence, between terminals 5 and 6 and terminals 8 and 7 in series, is also 20.06 units. The two resultant e.m.f.'s are co-phasal. The layer factor is 0.955, the pitch factor is 1.0 and the winding factor is 0.955. Phases B and C are symmetrically disposed at 120° mechanical separation with respect to phase A, so that only phase winding A of FIG. 3 need be considered.

In the 2 circuit per phase arrangement of FIG. 3, four coil-sequences in all are shown, respectively between terminals 1, 2; terminals 5, 6; terminals 3, 4 and terminals 7, 8. These coil-sequences contain, respectively 10 coils, 10 coils, 11 coils and 11 coils.

Figure 6:
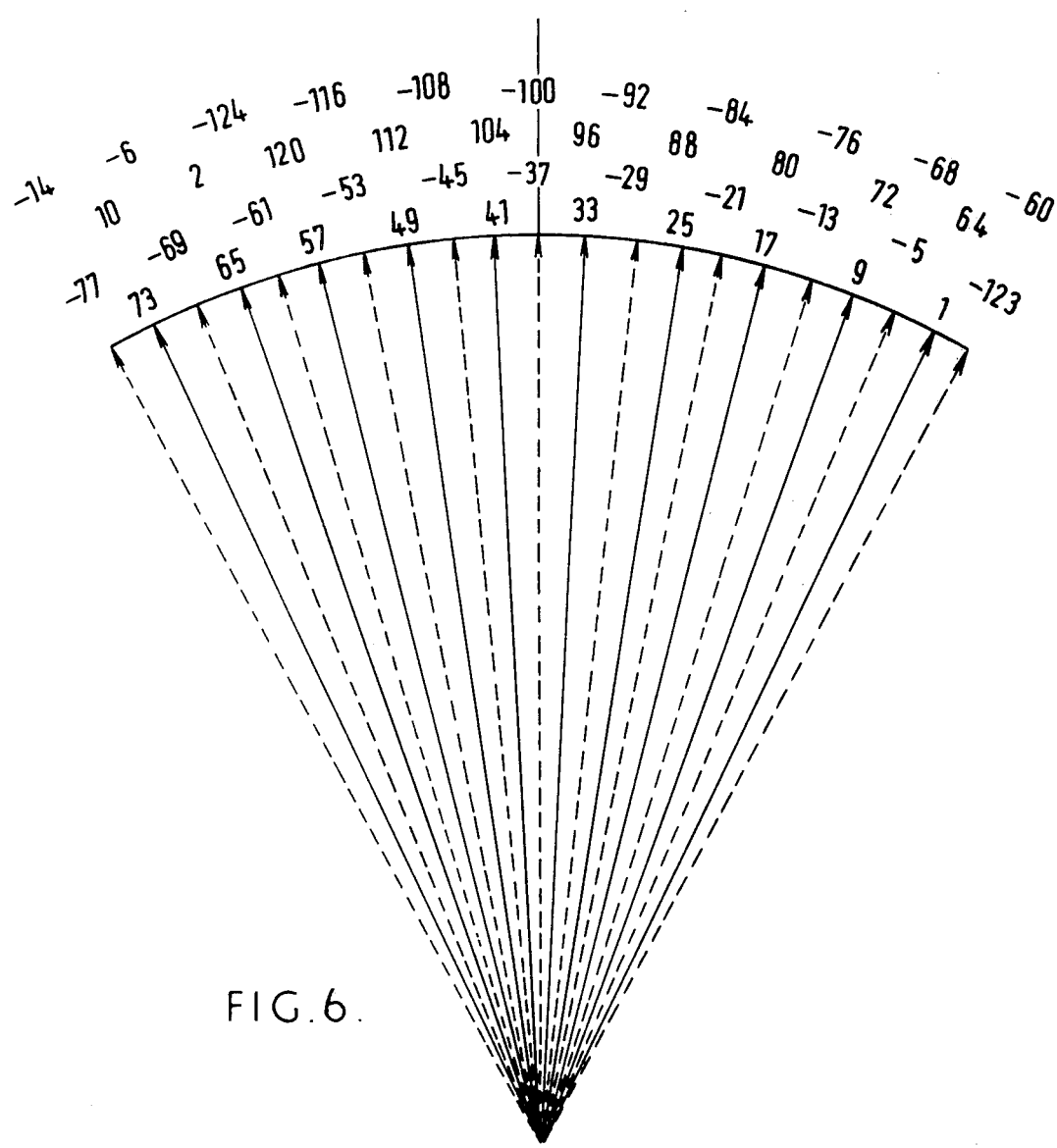
FIG. 6 is a slot vector diagram for one phase of the 32-pole winding shown in FIG. 3.

Analysing, now, the slot-vectors of the two 11-coil coil-sequences on a 32-pole scale, it will be seen that the slot-vectors of five coils are each symmetrically disposed with respect to the slot-vectors of five other coils about the slot-vector corresponding to coil T37 and coil T100, respectively, see FIG. 6.

Figure 4:
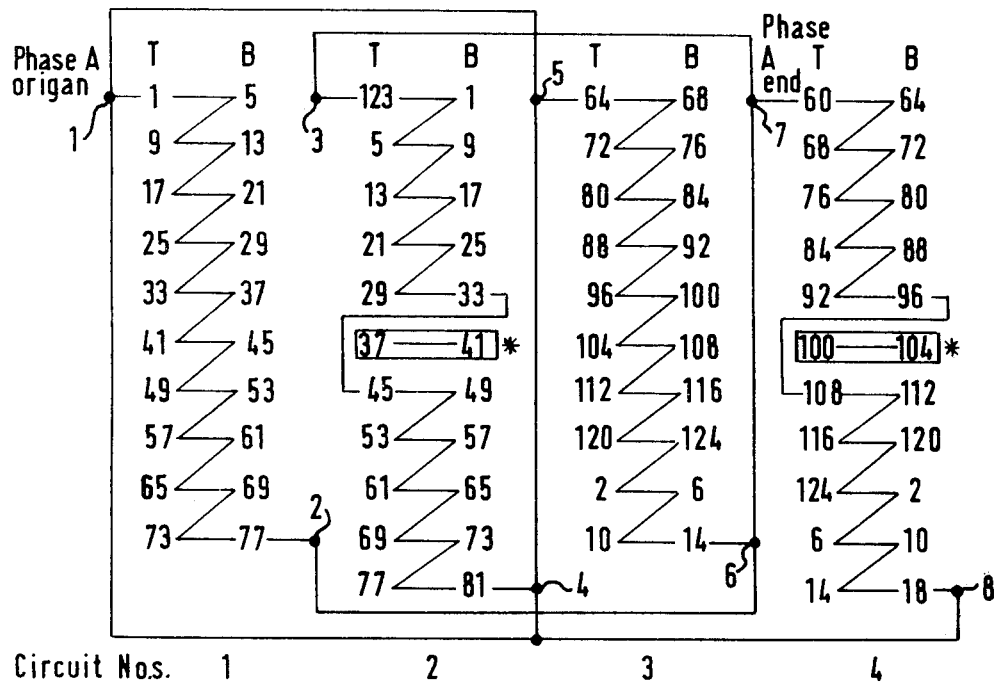
FIG. 4 shows one phase-winding of a corresponding 32-pole, three-phase wave winding in 126 slots according to the invention.

FIG. 4 shows phase A of a modified 3-phase, 32-pole wave winding in 126 slots, according to the present invention, wherein the coils T37 and T100 of the FIG. 3 arrangement are omitted from circuit in the respective 11-coil coil-sequences, reducing them to 10-coil coil-sequences.

As in the earlier figures, the letters "T" and "B" represent "T"—top coil-sides and "B"—bottom coil-sides. The two dummy coils are represented by rectangular blocks enclosing the coil-side slot numbers. The winding of the invention provides the additional 4-circuit connection shown in FIG. 4 and the four circuits are indicated by the Circuit No. numerals 1 to 4 beneath the respective coil-sequences.

Assuming unit e.m.f. per coil, the resultant e.m.f. of each of circuits No. 1 and No. 3 is 9.59 units. The resultant e.m.f. of each of circuits No. 2 and No. 4 is 9.46 units. The resultant e.m.f.'s of all four circuits are co-phasal and the average resultant e.m.f.'s are 9.53 units.

The layer factor is 0.907, the pitch factor is 1.0 and the winding factor is 0.907.

The three permissible connections of the windings: 2-parallel star/2-parallel delta/4-parallel delta provides output, or supply rating, voltages in the ratios $2\sqrt{3}:2:1$ or, in the specific case, 380 volts/220 volts/110 volts.

The windings according to the invention, as exemplified by the parallel-connected windings of FIG. 2 and FIG. 4 provide not only the additional output, or supply, voltage rating described but, in common with known multi-parallel circuit windings, provide harmonic suppression, reduction of magnetic noise, and enhancement of starting and running torque, when used as motor windings, or provide improvement of transient performance and of output waveform, when used as generator windings.

The use of dummy coils, as described, to permit of doubling of the number of parallel circuits, reduces the winding factors by some 5% in each of the two examples given with reference to FIGS. 2 and 4.

The dummy coils described may also be included in the Series star/Series delta and 2-parallel star/2-parallel delta connections of FIG. 2 and FIG. 4 respectively. The voltage ratings of the winding with all coils in circuit are modified in consequence, so that the obtainable ratings are in the ratios $(1.05 \times 2\sqrt{3}):(1.05 \times 2):1$ or, in the specific case, 400 volts:230 volts:110 volts, which may often be a more advantageous voltage rating.

The 28-pole winding in 99 slots of FIG. 2 and the 32-pole winding in 126 slots of FIG. 4 both have co-phasal induced e.m.f.'s in the parallel branches of each phase-winding, as has been explained with reference to FIG. 5 and FIG. 6, respectively, but slightly different magnitudes.

There is an alternate multi-parallel circuit connection wherein the fundamental e.m.f's induced in all the branches of each phase-winding are equal in magnitude but differ slightly in phase.

FIG. 7 shows the alternate arrangement by comparison with FIG. 2 and FIG. 8 shows the alternative arrangement by comparison with FIG. 4.

In FIG. 7, as in FIG. 1 and FIG. 2, "T" denotes the Top and "B" denotes the Bottom coil-side slot location. The pitch is 3 slots.

In the arrangement of FIG. 7, the connection of the left-hand coil sequence are: terminal 1 to coil-side T1, coil side B53 to terminal 2, terminal 2 to terminal 4 omitting the slot position T.57 as the 9th coil, terminal 4 to coil side B63 and coil side T11 to terminal 3. The connections of the right-hand coil sequence are: terminal 5 to coil side T64, coil side B17 to terminal 6, terminal 6 to terminal 8, terminal 8 to coil side B7 and coil side T54 to terminal 7, there being no dummy coil. The two phase winding parts are parallel between terminals 1/5 and terminals 3/7, as shown.

Assuming unit e.m.f. for every coil of the phase-winding, the resultant e.m.f.'s of the left-hand and right-hand coil sequences are both 15.26 units, but they differ in phase by 1.82° electrical. The winding factor is 0.899.

Parallel connection of the phase winding parts between terminals 1, 2, 4 and 3 and between terminals 5, 6, 8 and 7 is electrically permissible, the resultant induced e.m.f. being no greater than that arising from manufacturing tolerances in coil-side location or lamination dissymmetry.

In the arrangement of FIG. 8, the connections of the first of the four circuits are: terminal 1 to coil side T1, coil side B37 to terminal 2, terminal 2 to terminal 4, terminal 4 to coil side B81 and coil side T45 to terminal 3. The connections of the second circuit are: terminal 5 to coil side T41, coil side B77 to terminal 6, terminal 6 to terminal 8 omitting slot position T37, terminal 8 to coil side B33 and coil side T123 to terminal 7. The connections of the third circuit are: terminal 9 to coil side T64, coil side B100 to terminal 10, terminal 10 to terminal 12, terminal 12 to coil side B18 and coil side T108 to terminal 11. The connections of the fourth circuit are: terminal 13 to coil side T104, coil side B14 to terminal 14, terminal 14 to terminal 16 omitting the slot position T100, terminal 16 to coil side B96 and coil side T60 to terminal 15.

Again assuming unit e.m.f. for every coil, the induced e.m.f. in each of the four circuits is 9.53 units. The e.m.f.'s of circuit 1 and 3 are co-phasal and the e.m.f.'s of circuits 2 and 4 are co-phasal but the first pair (circuits 1 and 3) differ in phase from the second pair (circuits 2 and 4) by 2.86° electrical. Again, parallel connection of all four circuits between terminals 1/5/9/13 and terminals 3/7/11/15 is permissible. Such a connection can be thus used to provide a 2-parallel star/2-parallel delta/4-parallel delta configuration (not shown).

The slot-numbers, 99 slots and 126 slots, of the examples given herein are low compared with slot-numbers which may be used in practice. As a rule, the greater the slot-number, the smaller the induced e.m.f. differences between parallel branches.

What I claim is:

1. A 3-phase alternating-current, single-pole-number, electric machine having three double-layer wave-sound stator phase-windings, each said phase-winding comprising an even number of similar but not identical phase-winding parts, the odd-numbered ones of said phase-winding parts differing from the even-numbered ones thereof by the presence of a dummy coil in said odd-numbered ones of said phase-winding parts, said phase-winding parts being connected together alternatively for alternative voltage operation, one alternative connection comprising parallel connection of all the phase-winding parts for each phase-winding.

2. A 3-phase alternating current electric machine having a stator wound with double-layer wave-wound coils forming three stator phase-windings, each phase-winding comprising an even number of phase-winding parts, said phase-winding parts being alternatively connected together for alternative voltage operation, one alternative connection comprising parallel connection of all the phase-winding parts for each phase winding, at least for said parallel connection each phase-winding part comprising the same number of coils connected in circuit, odd-numbered ones of said phase winding parts spanning stator slot positions locating a dummy coil which is included in the winding sequence of said stator coils but not included in circuit therewith.

3. An electric machine having a three-phase, wave winding comprising a plurality of similar but not identical phase-winding parts comprising coils, said parts being connected together alternatively for alternative voltages, one such connection providing an arrangement wherein all of said phase-winding parts are connected in parallel, and said parts differing, one from another, by the presence of a dummy coil in one of the said parts.

4. An electric machine as claimed in claim 3, in which one phase-winding part of every pair thereof includes a slot position devoid of coils.

5. An electric machine as claimed in claim 4, in which said slot position devoid of coils is substantially in the center of the said phase-winding part.

6. An electric machine as claimed in claim 3, comprising, in each phase, two phase-winding parts being adapted for connection alternatively in series star/series delta/parallel delta.

7. An electric machine as claimed in claim 4, comprising, in each phase, four phase-winding parts forming two said pairs, said four parts adapted for connection together alternatively in 2-parallel star/2-parallel delta/4-parallel delta.

8. An electric machine as claimed in claim 3, wherein phase-winding parts which are adapted for connection together in said parallel arrangement have resultant induced e.m.f.'s which are co-phasal but differ in magnitude from one another.

9. An electric machine as claimed in claim 3, wherein phase-winding parts which adapted for connection together in said parallel arrangement have resultant induced e.m.f.'s which are equal in magnitude but differ in phase one from another.

* * * * *